US012212790B2

(12) United States Patent
Coppelmans et al.

(10) Patent No.: US 12,212,790 B2
(45) Date of Patent: Jan. 28, 2025

(54) METHODS AND SYSTEMS FOR EFFICIENT STREAMING OF AUDIO FROM CONTACT CENTER CLOUD PLATFORM TO THIRD-PARTY SERVERS

(71) Applicant: GENESYS CLOUD SERVICES, INC., Menlo Park, CA (US)

(72) Inventors: Camiel Coppelmans, Menlo Park, CA (US); Felix Immanuel Wyss, Indianapolis, IN (US); Matt Jahns, Indianapolis, IN (US)

( * ) Notice: Subject to any disclaimer, the term of this patent is extended or adjusted under 35 U.S.C. 154(b) by 15 days.

(21) Appl. No.: 18/373,253

(22) Filed: Sep. 26, 2023

(65) Prior Publication Data

US 2024/0107083 A1    Mar. 28, 2024

Related U.S. Application Data

(60) Provisional application No. 63/409,844, filed on Sep. 26, 2022.

(51) Int. Cl.
*H04N 21/233*    (2011.01)
*H04N 21/218*    (2011.01)

(52) U.S. Cl.
CPC ....... *H04N 21/233* (2013.01); *H04N 21/2181* (2013.01)

(58) Field of Classification Search
CPC .......................... H04N 21/233; H04N 21/2181
See application file for complete search history.

(56) References Cited

U.S. PATENT DOCUMENTS

| 11,528,302 | B2* | 12/2022 | Gutta | H04L 65/61 |
| 11,637,929 | B2* | 4/2023 | Balasaygun | H04M 3/5191 |
| | | | | 379/265.09 |
| 2018/0176281 | A1* | 6/2018 | Arunachalam | H04L 43/0829 |
| 2021/0321002 | A1* | 10/2021 | DiMaria | H04L 65/4015 |

* cited by examiner

*Primary Examiner* — Mulugeta Mengesha

(57) ABSTRACT

A method for providing streaming audio over a network from a client to a server associated with a third-party service. The method includes receiving configuration data from a tenant regarding the server. The method may further include establishing a connection with the server via a connection process. The connection process includes sending a connection request that includes: a bidirectional communication protocol configured to transmit data from the client to the server and from the server to the client by reusing an established connection channel; a tenant-Id parameter; and a session-Id parameter. The method may further include implementing an open transaction for initiating the streaming of the audio of the ongoing conversation to the server. The open transaction includes transmitting participant parameters identifying the customer and at least one choice regarding an audio format for the audio streaming.

20 Claims, 5 Drawing Sheets

METHODS AND SYSTEMS FOR EFFICIENT STREAMING OF AUDIO FROM CONTACT CENTER CLOUD PLATFORM TO THIRD-PARTY SERVERS

CROSS-REFERENCE TO RELATED APPLICATIONS AND PRIORITY CLAIM

This application claims priority to U.S. provisional application 63/409,844, filed Sep. 26, 2022, titled "SYSTEMS AND METHODS FOR PROVIDING REAL-TIME VOICE INTERACTIONS FROM CLOUD PLATFORMS TO THIRD-PARTY SERVICE ENDPOINT".

BACKGROUND

The present invention generally relates to the field of contact centers and customer relations management. More particularly, but not by way of limitation, the present invention pertains to assisting customers via internet-based service options, including improved methods and systems for streaming audio from contact center cloud platforms to third-party servers.

BRIEF DESCRIPTION OF THE INVENTION

The present invention describes a computer-implemented method for providing streaming audio over a network from a client, which is a contact center cloud platform, to a server associated with a third-party service. The streaming audio may be audio derived from an ongoing conversation occurring via the contact center cloud platform between an agent and a customer. The agent is a representative of a tenant of the contact center cloud platform and the customer is a customer of the tenant. The method may include receiving, by the contact center cloud platform, configuration data from the tenant regarding establishing a connection with the server of the third-party service, the configuration data including at least a network address of the server. The method may further include, in relation to streaming the audio of the ongoing conversation, establishing, by the contact center cloud platform, a connection with the server of the third-party service via a connection process given the configuration data provided by the tenant. The connection process includes sending a connection request that includes: a bidirectional communication protocol configured to transmit data from the client to the server and from the server to the client by reusing an established connection channel; a tenant-Id parameter that identifies the tenant; and a session-Id parameter that identifies an audio streaming session to which the connection request pertains. The method may further include, in response to establishing the connection with the server of the third-party service, implementing, by the contact center cloud platform, an open transaction for initiating the streaming of the audio of the ongoing conversation to the server. The open transaction may include: transmitting an open message to the server that includes: participant parameters identifying the customer; and at least one choice regarding an audio format for the audio streaming. The open transaction may further include receiving an opened message from the server that indicates: a readiness to receive the streaming audio of the ongoing conversation; and a selection in regard to the at least one choice regarding the audio format. The method further includes streaming, by the contact center cloud platform, the audio of the ongoing conversation pursuant to a streaming protocol. The streaming protocol includes sending successive messages per the bidirectional communication protocol that each includes: raw audio data consistent with the selection regarding the audio format; and a position property that indicates a current position in the audio stream from a perspective of the client when the client sent the message.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

Figure 1:
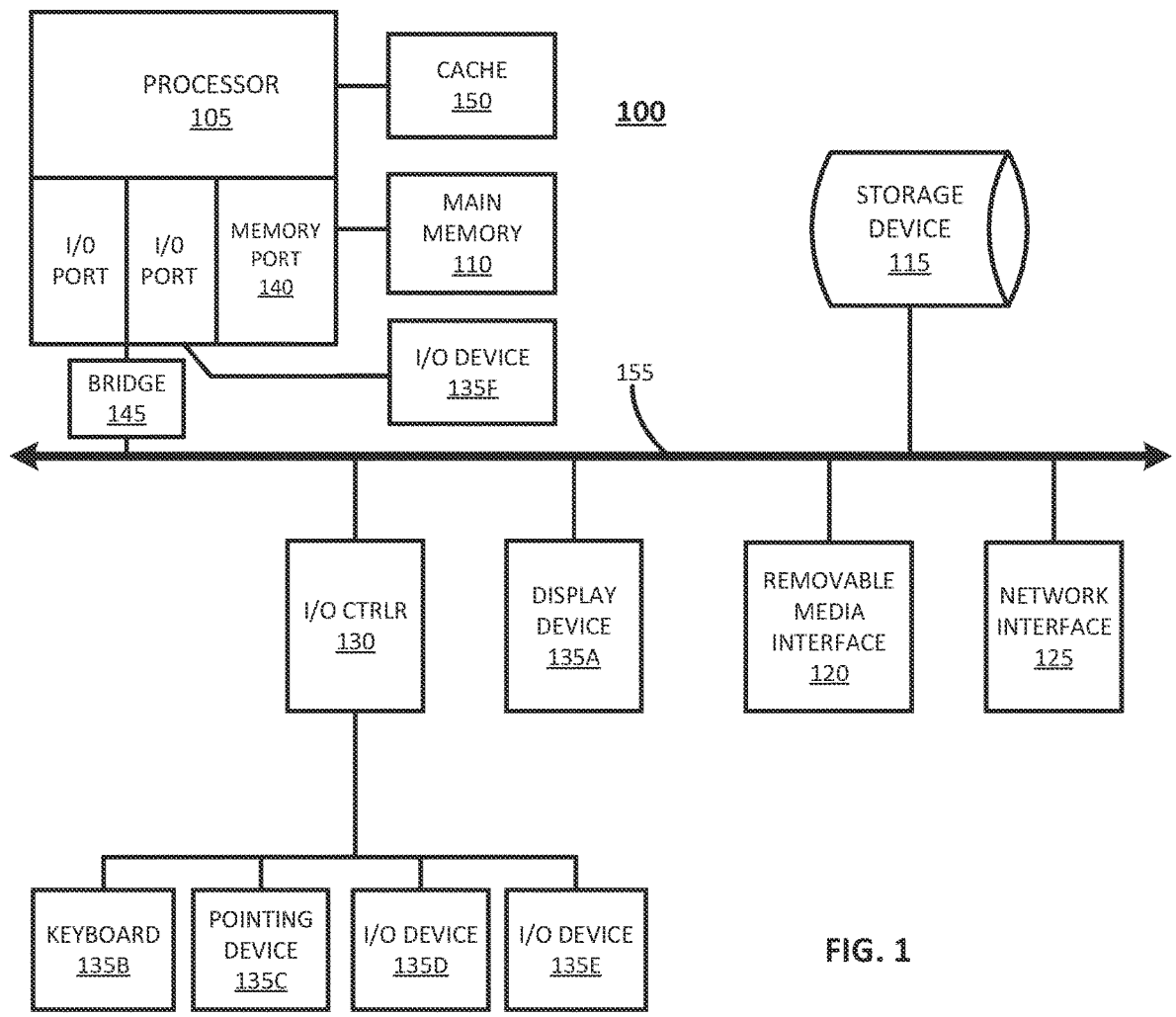
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Those skilled in the art will recognize from the present disclosure that the various embodiments may be computer implemented using many different types of data processing equipment, with embodiments being implemented as an apparatus, method, or computer program product. Example embodiments, thus, may take the form of an entirely hardware embodiment, an entirely software embodiment, or an embodiment combining software and hardware aspects. Example embodiments further may take the form of a computer program product embodied by computer-usable program code in any tangible medium of expression. In each case, the example embodiment may be generally referred to as a "module", "system", or "method".

Computing Device

It will be appreciated that the systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following FIGURES (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following FIGURES—such as, for example, the contact center system 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (SaaS) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The I/O devices 135 and/or the I/O controller 130 may include suitable hardware and/or software for enabling the use of multiple display devices. The computing device 100 may also support one or more removable media interfaces 120, such as a disk drive, USB port, or any other device suitable for reading data from or writing data to computer readable media. More generally, the I/O devices 135 may include any conventional devices for performing the functionality described herein.

The computing device 100 may be any workstation, desktop computer, laptop or notebook computer, server machine, virtualized machine, mobile or smart phone, portable telecommunication device, media playing device, gaming system, mobile computing device, or any other type of computing, telecommunications or media device, without limitation, capable of performing the operations and functionality described herein. The computing device 100 include a plurality of devices connected by a network or connected to other systems and resources via a network. As used herein, a network includes one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. It should be understood that, unless otherwise limited, the computing device 100 may communicate with other computing devices 100 via any type of network using any conventional communication protocol. Further, the network may be a virtual network environment where various network components are virtualized.

Contact Center

Figure 2:
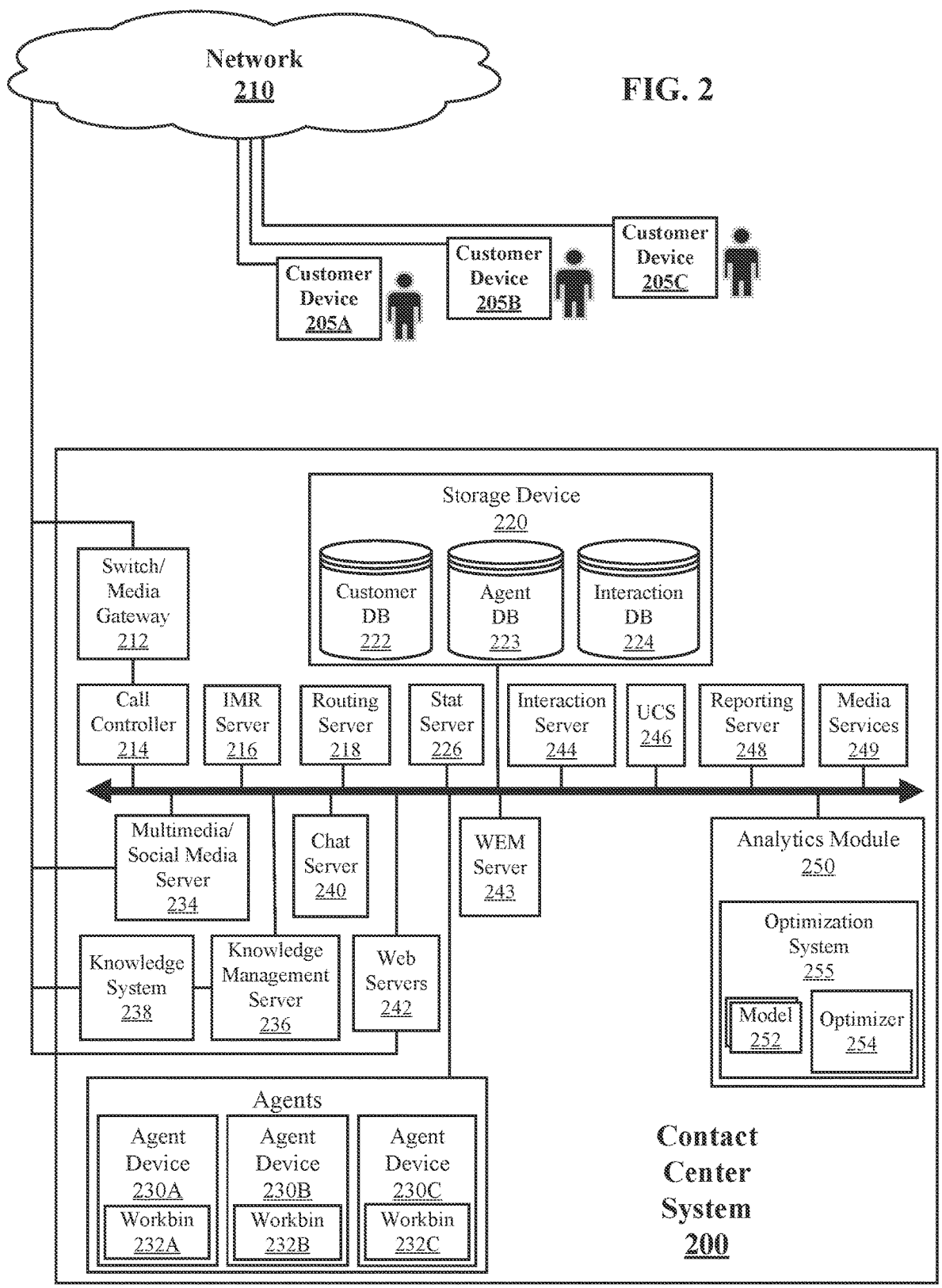
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize automated processes in place of live agents, such as, for example, interactive voice response (IVR) systems, interactive media response (IMR) systems, internet robots or "bots", automated chat modules or "chatbots", and the like.

Referring specifically to FIG. 2, the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction (or "iXn") server 244; universal contact server (or "UCS") 246; reporting server 248; media services server 249; and analytics module 250. It should be understood that any of the computer-implemented components, modules, or servers described in relation to FIG. 2 or in any of the following FIGURES may be implemented via types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the routing server 218, it may function to route incoming interactions. For example, once it is determined that an inbound communication should be handled by a human agent, functionality within the routing server 218 may select the most appropriate agent and route the communication thereto. This type of functionality may be referred to as predictive routing. Such agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

Regarding data storage, the contact center system 200 may include one or more mass storage devices—represented generally by the storage device 220—for storing data in one or more databases relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices—i.e., agent devices 230A, 230B and 230C—it should be understood that any number may be present.

In regard to the multimedia/social media server 234, it may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson or a like system.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction (iXn) server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like. The models 252 may include time series forecasting models as described in more detail below.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2 (as well as the other FIGURES included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment.

Audio Streaming

Figure 3:
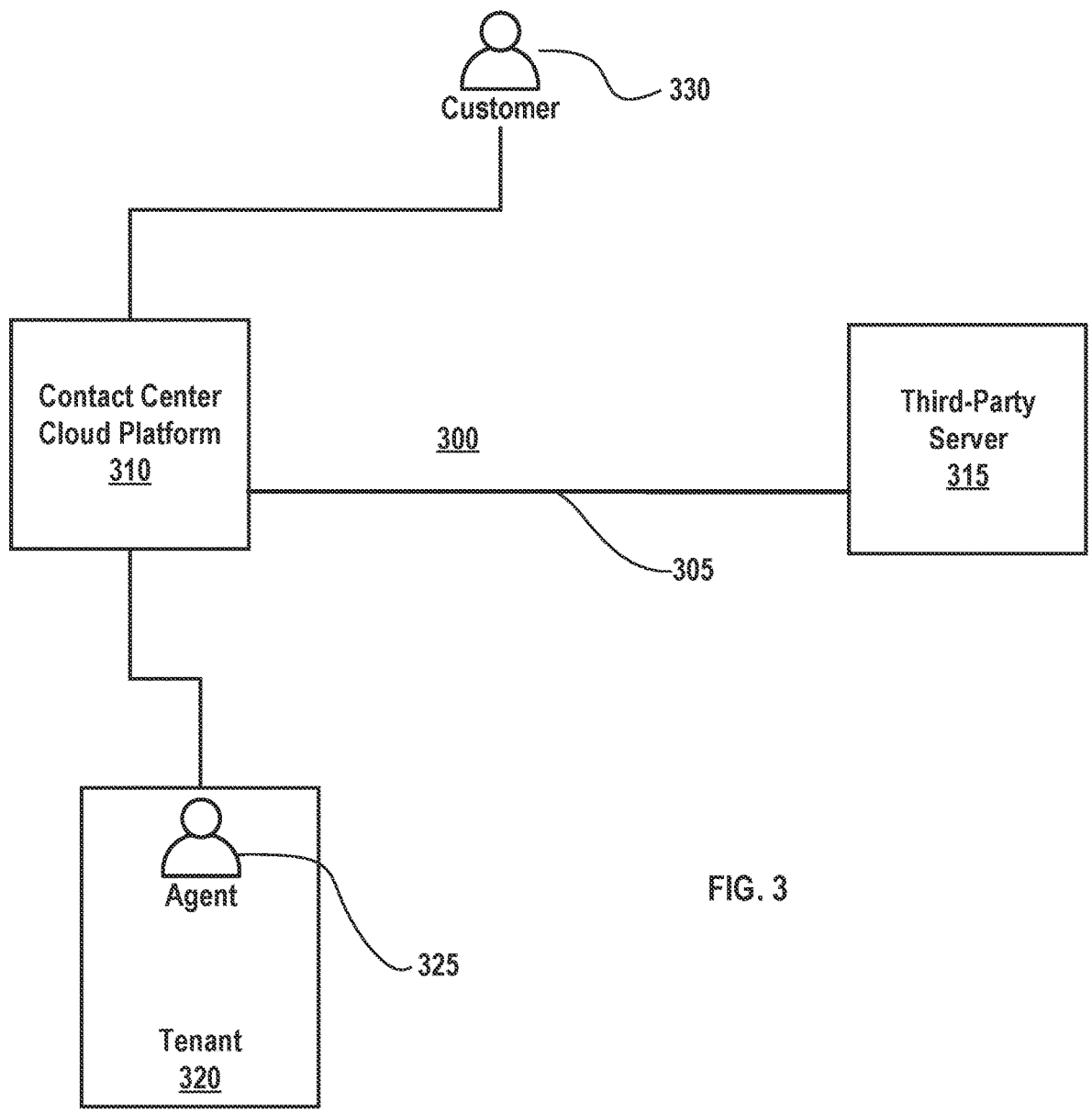
FIG. 3 is a schematic representation of an exemplary audio streaming system in accordance with embodiments of the present invention.
Figure 4:
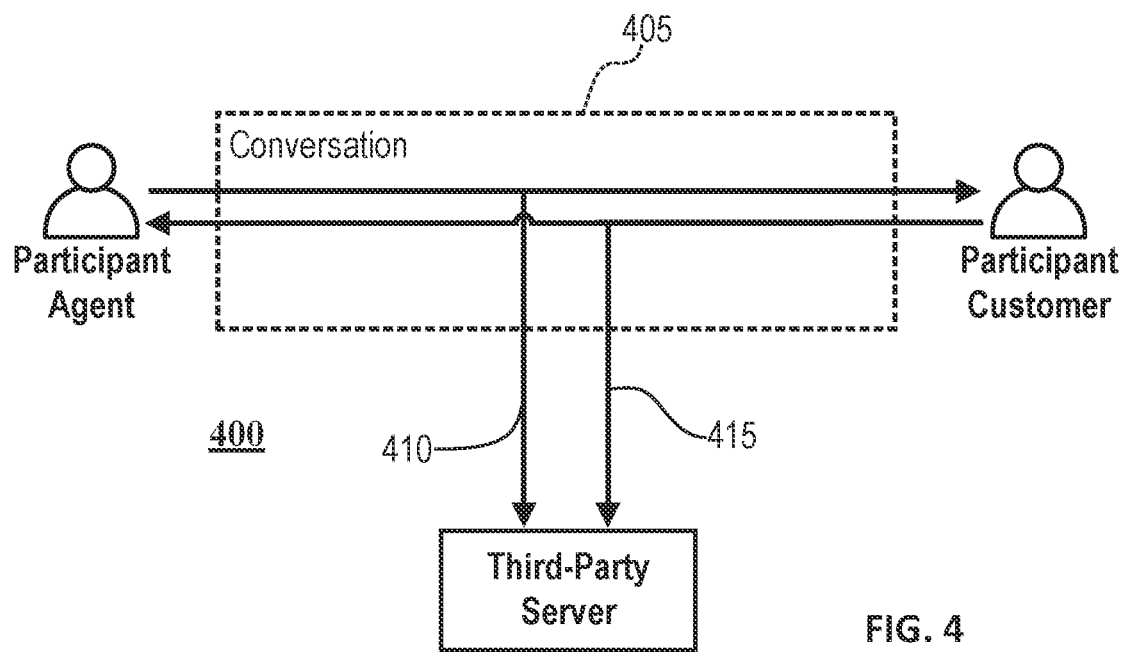
FIG. 4 is a schematic representation of an exemplary audio-streamer in accordance with embodiments of the present invention.
Figure 5:
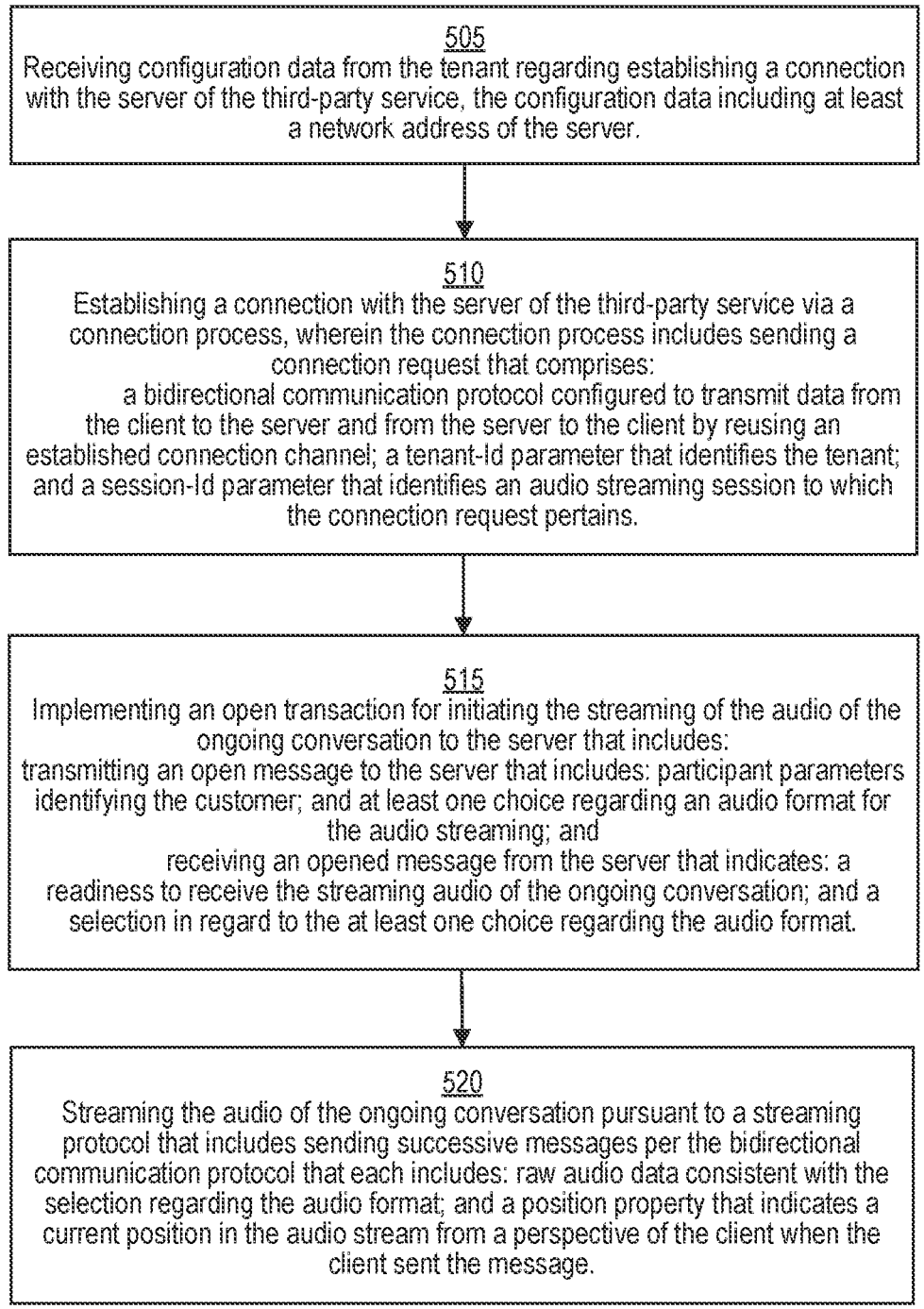
FIG. 5 is an exemplary method for audio streaming in accordance with embodiments of the present disclosure.

Turning now to FIGS. 3-5, the functionality and operation associated more particularly with the present invention will now be discussed in accordance with example embodiments. With particular reference to FIG. 3, the present invention includes a system 300 for providing streaming audio 305, for example, between contact center cloud platform 310 and a third-party endpoint or service, which is shown as third-party server 315. As explained herein, the system 300 may include several facilitating system components and operate according to certain protocols and methods, which may together and/or separately define embodiments of the present invention. For ease of reference, these embodiments may generally be referred to as an "audio-streamer". In certain embodiments, as depicted, the audio-streamer of the present invention may include a system and/or protocol for providing the real-time streaming of audio voice data from the contact center cloud platform to a third party business or service. As will be seen, the functionality provided by the present audio-streamer efficiently enables a contact center to extend the contact center cloud platform to third-party services that require monitoring voice interactions in real-time, such as, for example, passive biometrics, transcription, speech analytics, agent coaching, sentiment analysis, recording, etc.

As depicted in FIG. 3, a variety of customer services may be enabled by customer service oriented companies via a contact center cloud platform 310, often in so-called "software as a service" or "contact center as a service" type of arrangements. Businesses, organizations or tenants, which are represented in FIG. 3 as a tenant 320, contract with such companies to employ those services provided by the contact center cloud platform 310 to interact with their customers and manage customer relationships. In this way, the tenant 320 applies the many services enabled via the cloud platform 310 toward its own customers 330. As part of the services provided by the contact center cloud platform 310, audio of conversations between agents 325 and customers may be recorded and/or processed by the contact center cloud platform 310 in real-time and employed in analytics, the results of which may be provided to the tenant 320.

In addition to the contact center cloud platform 310, the tenant 320 may contract with other third-party services (i.e., businesses) that also provide analytics in relation to the processed audio that is produced during the customer/agent interactions that are hosted via the contact center cloud platform 310. In such cases, the tenant 320 may request that the CC cloud platform 310 stream the audio to the third-party server 315 so that it may be put to a particular use. The audio-steamer of the present invention enables this streaming capability in a highly efficient manner. As will be seen, the tenant 320 merely has to provide a minimum amount of initial configuration information to the contact center cloud platform 310 to initiate the real-time streaming of audio data to a desired third-party server 315. With this initial information, the present audio-streamer effectively taps into the agent/customer audio stream that is being processed in the cloud and securely delivers that stream in a desired format to a desired location. In describing this streaming, the contact center cloud platform 310 may be referred to as a "client", while the third-party server 315 may be referred to simply as a "server".

In certain embodiments, as discussed more below, the present audio-streamer may include a bidirectional communication protocol that is configured to send data from the client to the server or from the server to the client by reusing an established connection channel. In a preferred embodiments, the bidirectional communication protocol may be implemented via a WebSocket connection or protocol. As will be appreciated, a WebSocket protocol is a computer communications protocol that provides full-duplex communication channels over a single TCP connection. In general, the Web Socket protocol enables interaction between a client and a server with lower overhead than half-duplex alternatives such as HTTP polling, facilitating real-time data transfer from and to the server. This is made possible by providing a standardized way for the server to send content to the client without being first requested by the client and allowing messages to be passed back and forth while keeping the connection open. In this way, a two-way ongoing conversation can take place between the client and the server. Further, the communications may be done over TCP port number 443, which is beneficial for environments that block non-web Internet connections using a firewall. Other similar communication protocols may also be used. The present audio-streamer may further secure the communications provided from the client, for example, the communications may be secured via Transport Layer Security. Transport Layer Security (TLS) is a cryptographic protocol designed to provide communications security over a computer network. As will be seen, the audio-streamer of the present invention does not require specialized libraries or services for orchestration, load balancing, serialization, or session management. The WebSocket protocol is able to carry two types of messages: binary and text. The binary messages may be used to carry the audio stream. The text messages may be used for metadata messages encoded as JSON.

One of the primary functionalities provided by the present audio-streamer is real-time streaming of audio. In certain embodiments, the present audio-streamer also supports sending events (metadata) back to the contact center cloud platform for integrations that can provide classes of pre-defined services that benefit from low-latency real-time messaging. For example, a service that provides real-time transcriptions may be able to send live results back to the contact center cloud platform through events for real-time and post-interaction analytics.

With reference to FIG. 4, a diagram 400 is shown illustrating how the present audio-streamer monitors a conversation between a customer and agent of the contact center cloud platform. Based on the system configuration, the contact center cloud platform may establish a session with the third-party server at a designated point or triggering event during a voice interaction. For example, the session may be initiated when the interaction first enters the system, or the session may be initiated when the interaction is transferred to a predetermined queue or explicitly by means of a call flow action or API request. Depending on the configuration, the third-party server may either receive a channel separated stream of both the customer (which may be referred to as an "external party") and agent (with may be referred to as an "internal party") or, alternatively, just receive the agent or customer respectively as a single channel. In certain embodiments, both channels may be offered and the server can select as part of the connection establishment whether both or one of the channels are desired.

As used herein, a participant resource instance (or simply "participant") represents a party that is a member of a conversation 405 that is taking place as part of an interaction occurring via the contact center cloud platform. In exemplary embodiments, the present audio-streamer is configured to include a session that monitors a specific one of the participants. That is, each session of the present audio-streamer monitors a particular participant and follows that participant through the conversation as the participant converses with other participants. In preferred embodiments, the audio-streamer monitors from the perspective of the customer. That is, monitors what the customer hears and what the customer says. Thus, as illustrated, a first audio stream may monitor what the customer hears. This stream may be described as streaming over an internal channel 410. A second audio stream monitors what the customer says. This stream may be described as streaming over an external channel 415. Configured in this manner, the streams consistently and seamlessly represent the audio from the perspective of a participant, thus including what they speak and what is sent to them or what they hear. Thus, to independently analyze the audio from the customer and the audio to the customer, two channels for the session may be invoked.

In cases where the customer is interacting with an automated resource (such as IVR or an agent bot), the internal channel 410 may monitor the automated resource. As used herein, unless otherwise specified, an agent may refer to a human agent or an automated agent. Similarly, while the customer is in a queue waiting for an agent and hears music while on hold, the internal channel will reflect the music. The same applies to when the agent places the customer on hold. For example, because the external channel 415 always reflects the audio received from the customer, the audio streaming session will reflect anything the customer utters while on hold. Further, the internal channel may represent audio from different internal sources, which may include a mix of multiple sources. For example, the internal channel of audio streaming session may monitor two agents if a second agent is included in the conversation. That is, the audio of the internal channel will include a mix of the audio from both agents. As stated, the internal channel 415 will reflect what the customer hears.

Attention will now turn to specific functionality related to an audio streaming session as well as associated protocol parameters. As stated, reference to the client is reference to the contact center cloud platform, whereas reference to the server refers to the third-party server. According to example embodiments, an audio streaming session may be initiated and terminated by the client. In accordance with exemplary embodiments, the lifetime of an audio streaming session may include the following high-level states. First, the client establishes the WebSocket connection to the third-party server using a HTTPS GET with the upgrade header and additional information to authenticate the client. Once the WebSocket connection has been established, the client initiates an open transaction via an "open" message. Along with the open message, the client may provide the server with session information and negotiates the media format. The client will not stream audio until the server completes the open transaction by responding with an "opened" message. Once the session is open, the client then starts sending audio to the server. The server may send event messages to the client. When the interaction ends (or on request by the server), the client initiates a close transaction, which ensures a clean finalization of the session. The client will not send any audio frames after issuing the "close" message. This allows the server to gracefully terminate downstream sessions, finalize results, and communicate them to the client as appropriate in event messages. The client terminates the TLS/TCP connection.

When establishing an audio streaming session, the contact center cloud platform or client may attempt an HTTPS GET request to the third-party server in order to establish a connection. The location or URL of the third-party server may be defined for the client by the associated tenant. That is, the tenant that desires for the audio to be streamed to the third-party server may provide the location of the third-party server. Once this is configured, the client may transmit the HTTPS request to the third-party server, with the request including the following additional information, for example, as HTTP headers. First, a tenant-Id may be included in the connection request. The tenant-Id may identify the tenant for which the audio streaming session is being established. Second, a session-Id may be included in the connection request. The session-Id may identify the audio streaming session to which the request pertains. Third, according to exemplary embodiments, a signature may also be included in the connection request. The signature may include a unique identifier that is used for authentication. For example, the signature may include an API key string preconfigured by the tenant within the contact center cloud program. The inclusion of the signature in the request provides a way for the server to authenticate the source of the audio. The following is an example HTTPS GET request with headers (note that, in this example, the audio-streamer of the present invention is referred to via the "AudioHook" tradename):

```
GET /api/v1/voicebiometrics/ws HTTP/1.1
Host: audiohook.example.com Connection: Upgrade
Upgrade: websocket
Sec-WebSocket-Key: SSdtIGEgV2ViU29ja2V0IQ==
Sec-WebSocket-Version: 13
User-Agent: Cloud Platform-AudioHook-Client
Audiohook-Tenant-Id: d7934305-0972-4844-938e-9060eef73d05
Audiohook-Correlation-Id: 30b0e395-84d3-4570-ac13-9a62d8f514c0
Audiohook-Session-Id: e160e428-53e2-487c-977d-96989bf5c99d
X-API-KEY: SGVsbG8sIEkgYW0gdGhlIEFQSSBrZXkh
Signature:
    sigl=:NZBwyBHRRyRoelqy1IzOa9VYBuI8TgMFt2GRDkDuJh4=:
Signature-Input: sigl=("@request-target" "@authority" "audiohook-tenant-
    id" "audiohook-session-id" "audiohook-correlation-id" "x-api-key");
    keyid="SGVsbG8sIEkgYW0gdGhlIEFQSSBrZXkh";
    nonce="VGhpc0lzQWuaXF1ZU5vbmNl";alg="hmac-
    sha256";created=1641013200;expires=3282026430
```

After successfully establishing the WebSocket connection, the client will initiate an open transaction over the WebSocket. The first thing the client will do after establishing a WebSocket connection is start an open transaction by sending an "open" message. The open transaction provides the server with information about the session, such as the conversation and the participant being monitored, media types, etc. For the participant being monitored (i.e., the customer being monitored), the information provided may include the name of the customer, a customer number, an originating number (i.e., the number the customer called from), and the destination number (i.e., the number the customer called). The client furthermore may further include a list of media types and channel configurations from which the server can make selections. The media types may include an audio streaming format and rate. This process may be similar to the offer-answer exchange of an SIP/SDP media negotiation. The audio streaming format or codec may include PCMU and provide sampling rates ranging from 300-3400 Hz. Other conventional codecs may also be used such as, for example, 16-bit linear (or "L16"), MP3, or WMA. PCMU is a preferred codec as it uses half the bandwidth of L16 and has more than sufficient dynamic range for voice audio. Further decoding PCMU to linear is stateless and can be efficiently handled by the server.

On receiving the "open" message, the third-party server responds. In the response, the server selects the audio format and rate that is desired and prepares any necessary back-end resources. When it is ready to receive audio, the server responds with a "opened" message. The client will not send audio frames until it receives the "opened" response from the server. If the server is not interested in receiving audio until some later point during a conversation, it can include a pause command (for example, "startPaused": true) in the parameters of the "opened" response to start the session in the paused state, as will be discussed more below. If the server does not want to open the session at all (i.e. reject it), it may do so by responding with a "disconnect" message instead of the "opened" message. However, the server must not just close the WebSocket/TCP connection. The client interprets an unsolicited disconnect/TCP RST as network or service failure and will attempt to reestablish the session, as will be discussed more below.

As soon as the client receives an "opened" response from the server, the client starts streaming audio. According to example embodiments, audio is sent as binary WebSocket frames containing the raw audio data. The audio is sent in the negotiated format. For example, according to example embodiments, the audio in the frames for PCMU and L16 may be headerless and the samples of two-channel streams are interleaved. The samples in the L16 format may be in little-endian byte order. Take the following example, a 100 ms audio frame in a format that is negotiated as being PCMU, two channels, and a 8000 Hz sample rate. The 100 ms audio frame would have 1600 bytes with the samples from each channel being interleaved. According to example embodiments, the number of samples included per frame may be variable and determined by the client, with there being a tradeoff between higher latency (larger frames) and higher overhead (smaller frames). According to example embodiments, the client will guarantee that frames only contain whole samples for all channels (i.e. the bytes of individual samples will not be split across frames). The server must not make any assumptions about audio frame sizes and maintain a timeline of the audio stream by counting the samples.

The position property in the message header represents the current position in the audio stream from the client's perspective when the client sent the message. It may be reported as time represented as ISO8601 Duration to avoid sample-rate dependence. Position within the streaming audio may be computed at the third-party server based on samples processed and the sampling rate. Specifically, dividing the samples processed by the sampling rate determines position within the audio stream.

According to example embodiments, the client may maintain a history buffer of at least 20 seconds of audio. Audio may be buffered while the client establishes the Web Socket connection and during the open transaction. At conclusion of the open transaction, the client may send the buffered audio to the server faster than real-time and then continue with the real-time stream. The rate at which the client "catches up" may depend. For example, the catch up rate may be a single large audio frame or several traffic-shaped smaller audio frames. The last audio frame of a conversation may be shorter that what is normally sent, as it represents the "residual" at the end of the stream. As mentioned above, the streaming protocol of the present invention allows audio frames to vary in size.

If establishing the connection and performing the open transaction takes longer than the amount of audio the client keeps in its history buffer, the client will indicate the lost audio through a "discarded" message before the first audio frame. The discard message may include the length of time of the lost audio. This allows the server to maintain the correct audio stream timeline. The manner in which the third-party server handles the gaps in the stream incurred by missing/lost audio may depend on the application or service being provided. In practice, the generous buffer size in the client should make audio loss unlikely.

According to example embodiments, while the session is active, the server may send "event" messages to the client. For example, the event messages allow the server to send metadata back to the contact center cloud platform. The parameters property of the event message includes an entity parameter that carries typed data. Schemas may be provided for these entities for specific use cases, such as for services that can provide real-time transcripts of the conversations.

According to example embodiments, while the connection is open, the client may send at regular intervals "ping" messages to the server. These types of messages are used to keep the session alive, monitor connection health, and measure end-to-end latency. On receiving a ping message, the server is instructed to respond immediately or as soon as possible with a "pong" message. The client uses this to determine the application level round-trip time. In example embodiments, the client communicates the most recent round trip time to the server in the subsequent ping message as parameter. If the server does not respond within a ping interval, the client may treat it as a lost connection and may choose to disconnect and re-establish the session. In exemplary embodiments, the client transmits ping messages at the same interval irrespective of whether there were other messages. The interval for the ping messages may be between 3 and 6 seconds. In a preferred embodiment, the interval is 5 seconds. Pings messages may not be sent during the open or close transaction process.

In certain instances, the server may not be interested in the audio stream. The server can request that the client pause the audio stream with the "pause" message. Upon receipt of this message, the client will respond with a "paused" message to acknowledge the request. Similarly, the client may pause the audio transmission in certain situations. For example, the client may pause the audio stream during the input operations in which sensitive information is handled that should not be disclosed to third parties. The client indicates such applause by sending a paused message to the server to acknowledge. As such, unprompted paused messages from the client indicate a client pause while prompted paused messages from the client confirm a server pause. The audio streaming session can be in both a client initiated and a server initiated pause at the same time. In such cases, the audio will not resume streaming until both the client and server have terminated their pauses.

In exemplary embodiments, the server can end its pause at any time by sending a "resume" message. This only asked to end server-initiated pauses. If the client is not also in a paused state, the client will respond with a "resumed" message. If a client-initiated pause is still active, however, the client will respond with a "paused" message to acknowledge the server's request while indicating that the audio stream is still paused. As far as the server is concerned, the first "paused" that it receives in an unpaused session indicates the session has become paused and the session will remain in the state until it receives a "resumed" message. The client trucks server and client-initiated pauses. As a "paused" message indicating a client-initiated pause and a server's "pause" messages might race, the server may send "pause" messages irrespective of client state. The client will respond with a "paused" response even if it is already paused. Similarly, if the server sends a "resume" while a client pause is active, it will receive a "paused" message. Thus, the server can infer the session state from the messages. The client discards audio while the session is paused and tracks the amount of audio it discards. On resumption, the server can re-synchronize the timeline based on the parameters in the "resumed" message and/or the position property.

In exemplary embodiments, when the conversation ends, the client will stop sending audio and initiate a "close transaction" message. The server can use the close transaction to finalize downstream analytics and report any final results to the client through "event" messages. The server must respond to a "close" message with a "closed" response to indicate to the client it is done. The client then closes the Web Socket TLS connection. Then exemplary embodiments, the server may ask for an early session termination by sending a "disconnect" message to the client. For example, the server may want to end the session if it does not need further audio and/or wants to save resources. If the server wants to maintain visibility of the session until completion but reduce resource use, it may prefer to just pause the audio. In example embodiments, a "disconnect" request is the only way for the server to disconnect. The audio streaming protocol of the present invention requires that the server not just close the WebSocket TLS connection on its own initiative. The client will interpret a connection closing that it did not initiate as network or server error, and the client will try to re-establish the session. Note that the client will try to re-establish the session up to reception of the "closed" message. Thus, even if the connection is lost during a "close" transaction, the client will try to reestablish the session. In example embodiments, if the server does not respond with "closed" in a timely manner, the client will send an 408 "error" message and close the connection.

In exemplary embodiments, the header field of the different message types of the audio streaming protocol may include a common format whether initiated by the client or the server. According to example embodiments, the header field may include a version number of the protocol. If a server does not understand the version, it must reject the connection. The header field may further include an identifier of the streaming session. This may be provided as a UUID string. The session identifying stays the same throughout the Web Socket session. Note that on reconnection, the session identifier will change. However, as discussed below, a way to refer back to the session that is being resumed is provided. As previously discussed, the session identifier is available during WebSocket session establishment in the Session-Id HTTP header. The header field may further include a string specifying the type of the message. This fields acts as discriminant for the union of supported messages. The header field may further include a sequence number property or "seq". The sequence number is a monotonically increasing positive integer value representing the number of the message since start of the session. The server and client must maintain separate sequence number counters that start at 1. The messages further include parameters/payload associated with the message. Messages of a specific type refine the schema of the messages' parameters properties.

In exemplary embodiments, the messages sent by the client extend the base message header with two additional properties, which includes server sequence number and duration. The server sequence number or "server seq" property represents the sequence number of the most recent message the client received from the server. It will be zero for the first message sent by the client. The duration property is the current position in the audio stream and is represented by an ISO 8601 duration string. The client derives this value from the number of samples of audio it processed divided by the respective sample rate. It will send the position always as fractional seconds following a "PT" prefix, such as, for example, "PT123.456755". The value of the position property represents the position in the audio stream as if the client had sent all audio to the server. Thus, it will include audio that was not actually sent to the server too, such as audio discarded during pauses, due to back-pressure, connection loss, or excessively long connection establishment duration, etc. The position value thus allows the server to maintain a precise timeline under all circumstances.

In exemplary embodiments, the messages sent by the server extend the base message header with an additional property of client sequence number or "clientseq". This property contains the sequence number of the most recent message received from the client. If the server has to initiate an early "disconnect" before the open transaction, it must set this value to 0.

As Web Sockets use TCP/TLS as underlying transport, delivery of messages is reliable and correctly ordered in each respective direction. However, as delivery is not instantaneous, multiple messages might be in-flight at any time. In order to maintain correct state, the client and server must be able to determine which messages the other party has seen or whether they are still "in flight". For that purpose, we require the server and client each maintain a monotonically increasing message sequence number. The sequences start at 1 and are incremented with each message sent. The client and server send their respective sequence number in the "seq header" property. In addition to their own sequence number counter value, the server and client each track the most recent sequence numbers seen from the peer and include it as "client seq" and "serverseq" property in their respective messages. Thus, each message sent by the client must include a serverseq property with the seq value of the most recent server message it processed, and all messages sent by the server must include a client seq property with the seq of the most recent client messages it processed.

Thus, for example, in regard to the first message sent from client, the client has not received any server messages. Thus, "seq" is given a value of 1 while the "serverseq" is given a value of 0, which may be represented in the message as {"seq":1, "serverseq":0}. To continue the example, the server then sends an initial message. The server sends this message after receiving the client's first message. In this case, the "seq" is given a value of 1 while the "clientseq" is given a value of 1, which is represented in the message as {"seq":1, "clientseq":1}. The client then sends a second message. The client sends this message after receiving the server's first message. In this case, the "seq" is given the value of 2 while the serverseq is given a value of 1, which may be represented as {"seq":2, "serverseq":1}. If the client had sent the second message before receiving the first message from the server, then the value of 0 would have been repeated as the value of "serverseq". Note that it does not matter how much time passes between messages and whether the other party has messages to send because reliable delivery is assumed. Thus, no explicit acknowledgement messages are necessary. If the client or server receives a message with a "seq" that is not strictly one higher than the previous message it received, it is considered a fatal protocol error. The client will respond with an "error" message with error code 409 and attempt a close transaction. The "serverseq" in the "error" message will be of the most recent valid message, not the one with the out-of-order "seq". If the client receives a "disconnect" message in response to a "close" message, for example, because the server is out of sync, the client will disconnect the connection as if it had received a "closed" response. When the server receives an out-of-order "seq", it must respond with a "disconnect" message with the error reason and continue as if it had not received the message with out-of-order "seq". The client will attempt a close transaction (as per semantics of the "disconnect" message). If the server receives a "close" message with out-of-order seq (which most likely means other client messages were lost for some reason), the present audio streaming protocol requires that it respond similarly with a "disconnect" with error reason. As we are in a close transaction, the client will disconnect the connection immediately on receiving the "disconnect".

The audio streaming protocol of the present invention may include several specific types of messages to achieve the desired functionality. While many of these message types have already been introduced, the following will provide additional characteristics and functionality associated with each.

In accordance with exemplary embodiments, the audio-streamer of the present invention may include a "close" message. The client may send a "close" message when the client wants to end the streaming session. The server begins finalizing the session after receiving the end message. The server may send any number of "event" messages to the client while closing. These events can be used to convey any final results of the conversation analytics. Once the server has completed any finalization steps, the server must send a "closed" message to the client signaling finalization. The client will not send any more audio or other messages during the close transaction. As it will not send any more audio, the position property in the message header will represent the total duration of the audio stream the server should have received. The "close" message includes a reason property type, which indicates the reason why the client is closing the connection. The server may use this to distinguish different cases where appropriate. An "end" reason conveys a normal conversation end. A "disconnect" reason means the client is closing the session because the server explicitly requested the disconnect by means of a "disconnect" message. A "reconnect" reason means the client is closing the session because the server requested a reconnect ("reconnect") and client completed successful establishment of a new session. An "error" reason means the client is closing the session due to an error, in which case an associated "error" message precedes the close transaction. The server should respond with a "closed" response in fewer than 10 seconds of the close message. If the client does not receive the closed response with that time, the client may send a 408 "error" message and disconnect the Web Socket. If the server closes the connection without responding with a "closed" response, the client will treat this as any other connection loss error and attempt to re-establish the connection. During the close transaction, the client will ignore messages that raced with the "close" message and otherwise would be considered in error. For example, if the "opened", "pause", "resume", "disconnect", or "reconnect" message races with the "close" message. The client uses the "clientseq" header to identify races as discussed herein and ignores said messages.

In accordance with exemplary embodiments, the audio-streamer of the present invention may include a "closed" message. The server sends a "closed" message when it has completed finalization of the session. This message acknowledges the end of the session and signals to the client that it can close the Web Socket connection. Any further messages from the server after the "closed" message is ignored by the client. The client will not wait indefinitely for the "closed" message. It will timeout after 10 seconds.

In accordance with exemplary embodiments, the audio-streamer of the present invention may include a "discarded" message. The client will send messages with type "discarded" whenever there is a discontinuity in the audio stream due to unexpected loss of audio. Some of these reason include back pressure on the client due to server falling behind processing or network congestion, connection establishment, and/or loss of audio in the client or upstream to the client. Included with the "discarded" message is a start property or parameter and a discarded property or parameter. The start parameter identifies the relative position (sample time) in the audio stream where audio was first lost. Thus, the server's current view of the audio stream should be at this position. The discarded parameter expresses the duration of the gap of lost audio in the audio stream. Note that the position header property in the message represents the new stream position. This means that the position header property of the audio stream may be calculated by adding the discarded parameter to the start parameter of the discarded message.

In accordance with exemplary embodiments, the audio-streamer of the present invention may include a "disconnect" message. The server can request to end the session by sending a "disconnect" message at any time. The client will begin a "close" transaction on receiving this message, which applies even if the client receives the "disconnect" before initiating the open transaction. Due to the potential of the "open" message racing with the early "disconnect" message, servers should expect that they might get an "open" message immediately followed by a close transaction. The server is not allowed to send an "opened" message in response to a "open" after having sent a "disconnect" message. Disconnect messages are the only valid way for a server to end a session. The client will treat disconnecting the Web Socket by the server as a connection failure and attempt to reestablish the session. The "disconnect" message has a parameters property type of reason, which may be represented as "DisconnectReason". The reason provides the reason as to why the server wants the connection disconnected. The client is configured to understand the following disconnect reasons: completed (which means the server is done with the audio stream and does not want to use up resources, thereby requesting that the client gracefully close the session; unauthorized (which indicates to client that the session cannot continue due to a failed client authentication or failed authorization of the server or a downstream resource); and error (which indicates to client that the server encountered a general error and is unable to continue the session). If the client receives the "disconnect" message after it has initiated the open transaction, the client with close the transaction irrespective of the reason code. From the server's perspective, "disconnect" messages with the error reason represent errors that are not retryable, which are cases where a reconnection is judged to not likely be successful. For example, such an error may include the server not understanding a protocol message. If the server feels the error represents a retryable situation, the server sends a "reconnect" message with the error reason instead. The client will accept "disconnect" messages in any state and not treat them as an error. Depending on the state, such messages may just be ignored and/or logged.

In accordance with exemplary embodiments, the audio-streamer of the present invention may include an "error" message. The client uses this message to indicate errors to the server. Errors messages are not fatal by themselves. The client will still attempt a close transaction before disconnecting even if the error that prompted the message is fatal.

The "error" message has the following parameters property type: a code parameter or "ErrorCode" (which includes a numeric code specifying the type of error, i.e., what went wrong, with the codes being adopted from the HTTP status codes); a message parameter (which includes a string expressing a human readable error message for diagnostics and logging purposes); and retry-after parameter (which applies only to a retryable 429 error and is expressed as a duration that indicates how long the server should wait before re-sending a message after receiving a 429 error).

The error codes may include the following. A 400 code indicates a "bad message" error. For example, this code may apply to the server sending a message to the client that is malformed (such as not well-formed JSON) or does not conform to the schema. Also a general catch-all error where the server is to blame. A 405 code indicates an "unknown message" error. For example, this may apply to a message sent by the client in response to messages from the server whose type property it does not understand. A 408 code indicates a "timeout" error. This error message may be sent by the client if the server does not respond fast enough to an "open" or "close" message. If an "open" transaction times out, the client will attempt a close transaction. If the "close" transaction times out, the client will disconnect the connection after sending this error. A 409 code indicates a "conflict" error. For example, this error code may apply when the message conforms to the protocol specification but was not valid in the current state, for example, if the server sends a "closed" message outside of a close transaction. A 413 code indicates a "message too large" error. The error code applies when the size of the message is excessively large. This error code may depend on the type of message but most commonly occurs in relation to an "event" message if the server sends payloads that are too large. A 415 code indicates an "unsupported media type" error. A 429 code indicates a "rate limit exceeded" error. This error code applies to when the server has exceeded the rate limit of messages sent to the client. A 500 code indicates an "internal error", which is used when a failure occurs on the client side. In such cases, the server does not assume there will be a proper close transaction. In certain cases, the client may attempt a close transaction and then attempt to reconnect. A 503 code indicates a "service unavailable" error. This type of error may be used when the client is unable to continue because a service it depends on is temporarily unavailable. This error may occur, for example, if the client fails to determine the information necessary to initiate the open transaction.

In accordance with exemplary embodiments, the audio-streamer of the present invention may include an "event" message. The event message is used by the server to send messages at any time after the connection has been successfully opened. Event messages may allow the server to send metadata and other notifications to the client. The parameters property of the "event" message contains an entity object implemented as tagged union of typed (meta)data.

In accordance with exemplary embodiments, the audio-streamer of the present invention may include an "open" message. As already described, after establishing the Web-Socket connection, the client initiates an open transaction by sending an "open" message, which provides the server with information about the session and available audio formats. This allows the server the opportunity to establish resources from the provided information and select the audio format that it wants to receive. The client will not send any audio until the server responds with a "opened" response indicating its choice of audio and readiness to receive it. In certain embodiments, the open transaction has a time limit of 5 seconds. If the underlying conversation ends before the client receives an "opened" message, the client will begin a close transaction without sending any audio. The server is prepared for a close transaction at any point after the connection has been established, including before the "open" message or during an open transaction. This avoids having to perform a dummy open transaction in cases of short-lived conversations that end during connection establishment or the open transaction. If the client is unable to initiate the open transaction because of an error, the client will send an "error" message and perform a close transaction. This may occur, for example, if the client is unable to determine the conversation details or is unable to continue for other reasons. If the server initiates a "disconnect" before receiving a "open" message, the server may still receive one as its message may race with the client's "open". The server may ignore the "open" message in that case. The server can use the server seq property in the message header to determine whether its "opened" message has raced with a close transaction (or other messages such as "disconnect" or "reconnect").

The open message provides several types of information to the server and may include several parameters or property types. The open message may include a tenant-Id parameter which is an identifier of the tenant on whose behalf the session is being made. This identifier is also available during Web Socket session establishment in the HTTP header. The open message may include a conversation-Id parameter which identifies the conversation that is being monitored. A participant parameter may include details about the participant or customer that the session is monitoring. As the session follows the participant of the conversation, the external channel represents what the customer speaks while the internal channel represents what the customer hears. The open message may include media parameters, including a list of offered media types and channel configurations. A continued session parameter may be used by the client to indicate that this is an attempt at resuming a session after connection loss.

The participant parameters of the "open" message may include several types of information about the participant customer that is being monitored. An ANI (Automatic Number Identification) string of the participant's originating number may be included, which may be provided by the carrier. The value may be normalized and formatted. The value may be an empty string if not available. A DNIS (Dialed Number Identification Service) string may be provided also, which indicates the number dialed by the participant.

If the client loses the connection to the server, the client will try to reestablish the session. The "open" message of such a resumed session will include a continued sessions parameter that provides details about the continued sessions. It represents an array with the most recent segment. The position will be provided representing the sample time in the audio stream of the monitored participant where the client will resume sending audio from. To reduce the likelihood of the server missing audio, the client will maintain a history buffer of a few seconds and restart the resumed session from the oldest position in its history buffer. By tracking the position of the audio it has received up to the connection loss and the position in the resumed session, the server is able to "stitch" together the audio stream. The elements of the continued sessions parameter contain the sequence numbers of the messages last sent and received by the client in relation to the original session, which assists the server to reestablish its state.

In accordance with exemplary embodiments, the audio-streamer of the present invention may include a "opened" message. As stated, servers are required to send an "opened" message back to the client in response to the "open" message. The opened message indicates a readiness to receive audio as well as select the desired audio format. After the client has received the "opened" message, the client starts sending binary audio frames to the server in an agreed upon format. The opened message may include media parameters, which is the manner that the audio format is selected by the server. Note that even though this parameter is an array, the server may only return one or none of the offered media formats. When responding with audio, the server must choose one of the entries offered by the "open" message. The server is not permitted to modify an offered media format.

The opened message may further include a "discard-to" parameter. If present, this discard-to parameter requests the client to discard buffered audio to a particular position. This allows optimizing the amount of buffered audio the client has to send to the server for seamless stitching during reconnection and handovers. The client accepts values less than the position property of the "open" message, even if "in the future", but the client will discard at most up to the current real-time position of the stream. If the client chooses to honor the request to discard audio, it acknowledges the amount with a "discarded" message. The server is required to consider this parameter a hint to the client and does not make assumptions as to how much audio the client will discard. If the "discard-to" value is less than or equal to the "position" parameter of the "open" message, the client will send a "discarded" message with the current position as "start" and "PT0S" as "discarded" (i.e. acknowledge the discard as no samples discarded). The server does not assume that the "discard-to" parameter will be honored by the client. If the client honors the request, it will acknowledge it through a "discarded" message. Treating this as hint or best-effort request allows the client flexibility and implicitly covers values that exceed the buffered window and current real-time stream position.

The opened message may further include a start-paused parameter, which may be provided as a true or false, with false being the default value. If the opened message comprises a true value for the start-paused parameter, the server is asking for the client to start the audio stream in the paused state.

The client will buffer audio during the Web Socket connection establishment and "open" transaction. Once it has received an "opened" response, it will send leading audio that occurred during the connection establishment and open transaction up to a limit set by the buffering limit, for example, 20 seconds of audio may be buffered. The buffered leading audio will be sent faster than real-time at an implementation defined rate until it catches up to real-time. This may be a reasonably large chunk or multiple traffic shaped messages. If the session establishment time (WebSocket connection plus "open" transaction) exceeds the client's audio buffer, a "discarded" message will be sent prior to the first audio frame.

In accordance with exemplary embodiments, the audio-streamer of the present invention may further include fast audio catch-up. During reconnection or handover, the client does not know how much audio the server already received on the previous session. As discussed, the client maintains a history buffer to avoid loss of audio during connection establishment and the open transaction. This same history buffer is used during reconnection and handover to repeat some of the most recent audio history. The position parameter of the "open" message specifies the start position of the audio of the session being established. For a normal session, this usually means "PT0S". As the stream position timeline is maintained across all continued sessions of a conversation/participant tuple, the position parameter of a continued session indicates therefore the stream position from where the audio will continue. As the client maintains a history buffer, that means the position represents the start of the history buffer. The server can seamlessly stitch the audio by discarding the duplicated audio. Even though the history is streamed faster than real-time to catch-up to the current position, this results in delay and unnecessary resource usage. To reduce duplication, the server can ask the client to discard leading audio by including a discard-to parameter in the "opened" response. The value of the position parameter of a continued session may be "PT0S" (i.e. from the beginning of the conversation) if the history buffer is large enough or the reconnect occurs early. The Server does not use the position parameter to distinguish initial from continued sessions. The continued sessions parameter is used for this function.

In accordance with exemplary embodiments, the audio-streamer of the present invention may include "pause" and "paused" messages. For example, the server can pause the stream by sending a "pause" message. The client will stop streaming audio and respond with a "paused" message to acknowledge that audio has been paused. The server does not assume that the stream has been paused until it receives the "paused" message. The "pause" message has no parameters. Pausing the stream can be either client or server-initiated. The client always sends this message when either the client or server initiates a pause. For example, if the stream is in a server-initiated pause and the client initiates its own pause, then the client will send a "paused" message. The "paused" message has no parameters. When pausing a stream, the client will stop sending audio before it sends the "paused" message. The server can use the "serverseq" header field to identify whether a "paused" message is due to a client initiated pause or "pause" request. Client pauses take precedence, which means the client will send a "paused" message even in response to a "resume" request from the server. When pausing a stream, the server expects to receive audio until it receives the "paused" message as audio frames might be in flight. Similarly, the server expects not to receive any audio until after the server receives a "resumed" message from the client.

In accordance with exemplary embodiments, the audio-streamer of the present invention may include ping and pong messages. As previously explained, the client periodically sends a ping message as a "keep alive" mechanism, to identify network issues, and to measure round-trip delay. The ping message may include a roundtrip duration parameter that reflects the most recent ping-pong exchange. The pong message is sent by the server in response to the latest received ping message. The server respond as quickly as practical to a ping message with the pong response. The client measures the time it takes from sending the ping message to receiving the pong message to track an estimated round-trip delay. This provides a simple means to identify network conditions, characterize latencies of middle-boxes and the server's networking stack, and whether the server is processing requests. The server must not send unsolicited messages. The client will reject them with a 409 "error" message. The pong message has no parameters.

In accordance with exemplary embodiments, the audio-streamer of the present invention may include a reconnect message. The reconnect message is best effort with no acknowledgement. The state of the session for which reconnection was requested does not change. Each session can only initiate one concurrent reconnect. The server cannot make any assumption about the state of a reconnect (and whether one is even happening) until it receives a "close" with "reason":"reconnect" message.

In accordance with exemplary embodiments, the audio-streamer of the present invention may include a resume message. The server can end a pause it has initiated by sending a "resume" message to the client. If there is no ongoing client-initiated pause, then the client will respond with a "resumed" message and resume sending audio. If there is a client-initiated pause, then the client will respond with a "paused" message to indicate to the server that the stream is still paused. It is always valid for a server to send a "resume" message. If the session isn't paused, the session state transitions from unpaused to unpaused and the client sends a "resumed" message. The "resume" message has no parameters.

In accordance with exemplary embodiments, the audio-streamer of the present invention may include a media type parameter and a media format parameter. The media type parameter specifies the type of media. Currently only audio is supported; however the present invention could be extended to video. As described earlier, the media format (also audio format) parameter specifies that manner in which the audio is streamed. The supported formats may include PCMU, L16, and other conventional audio streaming formats. A media-channel parameter may also be included. An array of strings are provided that represent the channels of the media format. The channels are in order as listed in this array. In the case of a stereo channel, the left channel is at index 0 and the right channel at index 1. Currently, two values are supported: external, which represents what the participant customer speaks, and an internal, which represents what the participant customer hears. The client may offer one or both channels for the server to select. This selection may also be preconfigured. A sample rate for the media format in Hertz may also be parameter, as discussed earlier.

In regard to client authentication, the contact center cloud platform may limit to connections servers through TLS and to hosts that present certificates signed by a public CA. For servers to authenticate clients that connect to them, an API key and client secret can be specified as part of the integration configuration. Contact center cloud platform manages both the API key and client secret with its secure credentials management service as they are considered sensitive information. The API key is passed as X-API-KEY header in the request establishing a session with a third-party server. In combination with the Tenant-Id header, the server can identify the tenant on whose behalf the session is being established and whether they are a legitimate subscriber. While the API key is treated as sensitive by Contact center cloud platform and the connection to the host specified in the wss://URI is encrypted, it does not provide a means of verifying the integrity of the requests to the server. For that purpose, a client secret can be configured in addition to the API key. If provided, the AudioHook client uses the client secret as key to sign the request according to Signing HTTP Messages.

In addition to the derived components @request-target and @authority, the following HTTP header fields are included in the signature (see Establishing Connec on): Audiohook-Tenant-Id, Audiohook-Correlation-Id, Audiohook-Session-Id, X-API-KEY. The client includes the following signature parameters: ALG is a signature algorithm parameter (currently only "hmac-sha256" will be used by the Genesys AudioHook client); key-Id is an API key value parameter (this is the same value as the X-API-KEY header field using the API key value as key-Id simplifies configuration for tenants and discourages key reuse by server implementers); created parameter is a UNIX timestamp value when client created the request (as each request gets a unique signature, servers can set a tight bound on valid signatures); expires parameter is a UNIX timestamp of client-specified signature lifetime (server reject expired signatures but may include some slop to allow for clock skew between client and server); and nonce parameter (this is a random byte sequence of at least 128 bits created by client uniquely for each request, with servers being instructed to reject signatures without a nonce).

The API key and client secrets must match the following. The API key can be simple tokens/identifiers, UUIds, or base-64 encoded octet sequences. The client treats the API key as opaque character sequence and does not perform any transforms on it. It is included as X-API-KEY header field and key-Id signature parameter. The client secret is interpreted as base-64 encoded octets and must therefore be provided in valid base-64 encoded representation. A server must be careful when validating the request and verifying the signature to reduce the risk of timing and side-channel attacks. General recommendations include: verifying the signature before validating other header fields; checking that the component list of the Signature-Input header field includes the expected header fields and derived components; if the key-Id references an unknown API key, performing signature verification with a dummy (random) key of the same length as a valid key would be; avoid switching on ALG signature parameter value during initial verification and always verify with "hmac-sha256" as that's the only algorithm the client will use (avoid short-circuiting and reduce potential for tweaking); not comparing signature as base-64 encoded string to avoid canonicalization attacks and instead, decode to binary and use timing-invariant comparison functions; delaying responses on failures to a fixed overall delay to further reduce leaking information through timing variances, such as caused by key lookups/cache misses; responding with 401 HTTP status code and no error-dependent details on all verification failures; and allowing server implementations to only verify the signature after the Web Socket has been accepted must signal authentication failures with a "disconnect" message with reason "unauthorized". In regard to the latter, this may be signaled at any time before, during, or after the open transaction. Servers therefore may retract authorization at any time during a session with a "disconnect" reason "unauthorized".

Another feature of the present invention is a throttling mechanism. As the client sends audio in real-time, poor network conditions or server overload may result in transmissions to be backed up in the client (TCP flow control). The client may limit the amount of outstanding audio queued for transmission. If the transmission falls behind, the client enters a "throttled" state and discards subsequent audio scheduled for transmission. When the congestion clears and/or the server catches up, the client will send a "discarded" message to indicate the amount of audio that was lost. The client then resumes transmission of audio at the respective timeline. The server should assume that some audio right after the "discarded" message might arrive at a rate that is faster than real-time. When congestion eases, the client may send some audio like it does after to catch-up to real-time. If the congestion becomes too severe, the client may need to end the session. This may appear to the server as if the client disconnected without a close transaction. However, the client will attempt to send a "close" message and wait. If the server does not catch up in time and the "close" message never makes it out of the buffer, the close transaction will time out and the client can disconnect without a "closed" response. In other words, the close transaction begins as soon as the client attempts to send a "close" message and not when the message is in-flight. The client may try to re-establish the session as best-effort to ensure it can communicate to the server that the session ended. During severe congestion, this might not be possible, though. The exact conditions under which throttling occurs (such as how many audio frames might be outstanding) depends on the upstream provider and a number of other factors outside the control of the client. The client must guarantee that discontinuities due to inability to send some of the audio (i.e. loss) is signaled through the "discarded" message. The client never discards other (non-audio) messages.

To avoid inadvertent or deliberate abusive behavior of server, the client limits the rate at which messages are accepted before the rate limiter triggers. The rate at which messages are accepted depends on the message type and for "event" messages, the entity type. The client employs the token bucket algorithm with parameters that depend upon the message type.

In exemplary embodiments, a connection probe may be employed to verify configuration settings before they are committed in the administration interface, the contact center cloud platform attempts to establish a WebSocket connection to the configured URI followed by a synthetic audio streaming session. This connection probe and synthetic session helps flagging integration configuration issues and verify minimal server compliance without needing manual test calls. The configuration probe session may include the following steps. First a WebSocket connection to the configured URI is initiated. If a client secret is provided, the request will be signed. Expect connection establishment (or failure) in less than 5 seconds. Initiate by sending an "open" message with the client passing Null UUIDs as a conversation-Id and participant-Id parameters. This identifies connection probes. It is expected that an "opened" response is received in less than 5 seconds. Optionally, between 4 and 8 seconds of audio may be sent in a chosen format. The audio that is sent may include a 1 kHz tone in the "external" channel and a 2 kHz tone in the "internal" channel. About one second after the "opened" response, a ping message is sent concurrently with audio. The pong response is expected to be received in reply in less than 2 seconds. Then a "close" message is sent with reason "end". It is then expected that a "closed" message is received in less than 5 seconds. The Web Socket connection is then disconnected. Deviations from the above are reported as failure. Any server initiated "disconnect" messages are also reported as a failure. The most commonly anticipated reason reported by servers is "unauthorized", which indicates incorrectly configured API keys or client secrets. For a simple probe, the client may omit sending synthesized audio and immediately follow the open transaction with a close transaction message. The client may offer the media as it is configured for the integration. The server is expected to perform the media selection on the connection probes as they expect on a "real" session. For cases where that may be context dependent, clients should offer the superset of supported audio formats and reject the session. Further, a server should reject a probe that does not include a required media format or custom parameter by responding with a "disconnect" with "reason":"error" and a descriptive message as information parameter. Additionally, the client does not perform reconnection attempts on connection probes due to connection failures and "reconnect" requests are ignored. The client should surface messages passed in the info parameter of a "disconnect" message from the server (and the reason) to the user to aid diagnostics.

With reference now to FIG. 5, an exemplary method 500 is shown in accordance with the present invention. The method may be used to provide streaming audio over a network from a client, which includes a contact center cloud platform, to a server associated with a third-party service. The streaming audio includes audio derived from an ongoing conversation occurring via the contact center cloud platform between an agent and a customer. The agent may be a representative of a tenant of the contact center cloud platform, and the customer may be a customer of the tenant. The method 500 may include the following steps.

The method 500 may begin, at step 505, by receiving, by the contact center cloud platform, configuration data from the tenant regarding establishing a connection with the server of the third-party service, the configuration data including at least a network address of the server.

At step 510, the method 500 continues by establishing, by the contact center cloud platform, a connection with the server of the third-party service via a connection process given the configuration data provided by the tenant. The connection process includes sending a connection request that includes: a bidirectional communication protocol configured to transmit data from the client to the server and from the server to the client by reusing an established connection channel; a tenant-Id parameter that identifies the tenant; and a session-Id parameter that identifies an audio streaming session to which the connection request pertains.

At step 515, the method 500 continues by implementing, by the contact center cloud platform, an open transaction for initiating the streaming of the audio of the ongoing conversation to the server. The open transaction includes transmitting an open message to the server that includes: participant parameters identifying the customer; and at least one choice regarding an audio format for the audio streaming. The open transaction further includes receiving an opened message from the server that indicates: a readiness to receive the streaming audio of the ongoing conversation; and a selection in regard to the at least one choice regarding the audio format;

At step 520, the method 500 continues by streaming, by the contact center cloud platform, the audio of the ongoing conversation pursuant to a streaming protocol, wherein the streaming protocol includes sending successive messages per the bidirectional communication protocol that each includes: raw audio data consistent with the selection regarding the audio format; and a position property that indicates a current position in the audio stream from a perspective of the client when the client sent the message.

In example embodiments, the third-party service includes an unaffiliated entity in relation to the contact center cloud platform. For example, the third-party service may be providing analytics for the tenant for which the streaming audio is required.

In example embodiments, the step of establishing the connection with the server of the third-party service is performed in relation to detecting an occurrence of a triggering event. The method may further include the step of monitoring, by the contact center cloud platform, conversations between agents representing the tenant and customers of the tenant and, in regard to the ongoing conversation between the agent and the customer, detecting, by the contact center cloud platform, a triggering event signaling a need to stream the audio of the on-going conversation to the server. In example embodiments, the triggering event includes one of: an initiation of the ongoing conversation; and the ongoing conversation being transferred to a predetermined queue.

In example embodiments, the bidirectional communication protocol includes a Web Sockets protocol. In example embodiments, the connection request includes an HTTP GET request with upgrade header. In example embodiments, the connection request further includes a signature, the client employing a client secret as a key to sign the connection request with the signature.

In example embodiments, the at least one choice regarding the audio format includes both a first choice regarding a codec for streaming the audio, and a second choice regarding a sampling rate. In example embodiments, the open message further includes a choice of channels, the choice of channels providing alternatives to the server of receiving: streaming audio of an internal channel that provides audio of what the customer is hearing; streaming audio of an external channel that provides audio of what the customer is saying; streaming audio of both the internal and external channels. In such cases, the opened message received from the server further includes a selection in regard to the choice of channels.

In example embodiments, the streaming protocol further includes the client maintaining a history buffer of at least 20 seconds of the audio of the ongoing conversation. In example embodiments, the streaming protocol further includes the client at regular intervals: sending a ping message to the server; receiving a pong message from the server in response to the ping message; and calculating a round-trip time given the ping message and the pong message reply.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A computer-implemented method for providing streaming audio over a network from a client, which comprises a contact center cloud platform, to a server associated with a third-party service, wherein the streaming audio comprises audio derived from an ongoing conversation occurring via the contact center cloud platform between an agent and a customer, the agent comprising a representative of a tenant of the contact center cloud platform and the customer being a customer of the tenant, the method comprising the steps of:

receiving, by the contact center cloud platform, configuration data from the tenant regarding establishing a connection with the server of the third-party service, the configuration data including at least a network address of the server;

in relation to streaming the audio of the ongoing conversation, establishing, by the contact center cloud platform, a connection with the server of the third-party service via a connection process given the configuration data provided by the tenant, wherein the connection process includes sending a connection request that comprises:
a bidirectional communication protocol configured to transmit data from the client to the server and from the server to the client by reusing an established connection channel;
a tenant-Id parameter that identifies the tenant; and
a session-Id parameter that identifies an audio streaming session to which the connection request pertains;

in response to establishing the connection with the server of the third-party service, implementing, by the contact center cloud platform, an open transaction for initiating the streaming of the audio of the ongoing conversation to the server, wherein the open transaction comprises:
transmitting an open message to the server that includes:
participant parameters identifying the customer; and
at least one choice regarding an audio format for the audio streaming;
receiving an opened message from the server that indicates:
a readiness to receive the streaming audio of the ongoing conversation; and
a selection in regard to the at least one choice regarding the audio format;

streaming, by the contact center cloud platform, the audio of the ongoing conversation pursuant to a streaming protocol, wherein the streaming protocol comprises sending successive messages per the bidirectional communication protocol that each includes:
raw audio data consistent with the selection regarding the audio format;
a position property that indicates a current position in the audio stream from a perspective of the client when the client sent the message.

2. The method of claim 1, wherein the third-party service comprises an unaffiliated entity in relation to the contact center cloud platform, the third-party service providing analytics for the tenant for which the streaming audio is required.

3. The method of claim 1, wherein the step of establishing the connection with the server of the third-party service is performed in relation to detecting an occurrence of a triggering event;
further comprising the step of monitoring, by the contact center cloud platform, conversations between agents representing the tenant and customers of the tenant and, in regard to the ongoing conversation between the agent and the customer, detecting, by the contact center cloud platform, a triggering event signaling a need to stream the audio of the on-going conversation to the server.

4. The method of claim 3, wherein the triggering event comprises one of: an initiation of the ongoing conversation; and the ongoing conversation being transferred to a predetermined queue.

5. The method of claim 2, wherein the bidirectional communication protocol comprises a Web Sockets protocol.

6. The method of claim 5, wherein the connection request comprises an HTTP GET request with upgrade header.

7. The method of claim 6, wherein the connection request further comprises a signature, the client employing a client secret as a key to sign the connection request with the signature.

8. The method of claim 1, wherein the at least one choice regarding the audio format comprises both a first choice regarding a codec for streaming the audio, and a second choice regarding a sampling rate.

9. The method of claim 1, wherein the open message further comprises a choice of channels, the choice of channels providing alternatives to the server of receiving:
   streaming audio of an internal channel that provides audio of what the customer is hearing;
   streaming audio of an external channel that provides audio of what the customer is saying;
   streaming audio of both the internal and external channels;
   wherein the opened message received from the server further includes a selection in regard to the choice of channels.

10. The method of claim 1, wherein the streaming protocol further comprises the client maintaining a history buffer of at least 20 seconds of the audio of the ongoing conversation.

11. The method of claim 10, wherein the streaming protocol further comprises the client at regular intervals:
   sending a ping message to the server;
   receiving a pong message from the server in response to the ping message; and
   calculating a round-trip time given the ping message and the pong message reply.

12. A system for providing streaming audio over a network from a client, which comprises a contact center cloud platform, to a server associated with a third-party service, wherein the streaming audio comprises audio derived from an ongoing conversation occurring via the contact center cloud platform between an agent and a customer, the agent comprising a representative of a tenant of the contact center cloud platform and the customer being a customer of the tenant, the method comprising the steps of:
   a processor; and
   a memory storing instructions which, when executed by the processor, cause the processor to perform a process that includes the steps of:
      receiving, by the contact center cloud platform, configuration data from the tenant regarding establishing a connection with the server of the third-party service, the configuration data including at least a network address of the server;
      in relation to streaming the audio of the ongoing conversation, establishing, by the contact center cloud platform, a connection with the server of the third-party service via a connection process given the configuration data provided by the tenant, wherein the connection process includes sending a connection request that comprises:
         a bidirectional communication protocol configured to transmit data from the client to the server and from the server to the client by reusing an established connection channel;
         a tenant-Id parameter that identifies the tenant; and
         a session-Id parameter that identifies an audio streaming session to which the connection request pertains;
      in response to establishing the connection with the server of the third-party service, implementing, by the contact center cloud platform, an open transaction for initiating the streaming of the audio of the ongoing conversation to the server, wherein the open transaction comprises:
         transmitting an open message to the server that includes:
            participant parameters identifying the customer; and
            at least one choice regarding an audio format for the audio streaming;
         receiving an opened message from the server that indicates:
            a readiness to receive the streaming audio of the ongoing conversation; and
            a selection in regard to the at least one choice regarding the audio format;
      streaming, by the contact center cloud platform, the audio of the ongoing conversation pursuant to a streaming protocol, wherein the streaming protocol comprises sending successive messages per the bidirectional communication protocol that each includes:
         raw audio data consistent with the selection regarding the audio format;
         a position property that indicates a current position in the audio stream from a perspective of the client when the client sent the message.

13. The system of claim 12, wherein the third-party service comprises an unaffiliated entity in relation to the contact center cloud platform, the third-party service providing analytics for the tenant for which the streaming audio is required.

14. The system of claim 12, wherein the step of establishing the connection with the server of the third-party service is performed in relation to detecting an occurrence of a triggering event;
   wherein the instructions, when executed by the processor, further cause the processor to perform the steps of:
      monitoring, by the contact center cloud platform, conversations between agents representing the tenant and customers of the tenant and, in regard to the ongoing conversation between the agent and the customer, detecting, by the contact center cloud platform, a triggering event signaling a need to stream the audio of the on-going conversation to the server.

15. The system of claim 14, wherein the trigging event comprises one of: an initiation of the ongoing conversation; and the ongoing conversation being transferred to a predetermined queue.

16. The system of claim 13, wherein the bidirectional communication protocol comprises a Web Sockets protocol.

17. The system of claim 16, wherein the connection request comprises an HTTP GET request with upgrade header.

18. The system of claim 17, wherein the connection request further comprises a signature, the client employing a client secret as a key to sign the connection request with the signature.

19. The system of claim 12, wherein the at least one choice regarding the audio format comprises both a first choice regarding a codec for streaming the audio, and a second choice regarding a sampling rate.

20. The system of claim 12, wherein the open message further comprises a choice of channels, the choice of channels providing alternatives to the server of receiving:
- streaming audio of an internal channel that provides audio of what the customer is hearing;
- streaming audio of an external channel that provides audio of what the customer is saying;
- streaming audio of both the internal and external channels;
- wherein the opened message received from the server further includes a selection in regard to the choice of channels.

* * * * *